Dec. 6, 1960     R. R. ZIMMER     2,963,040
DOME TYPE REGULATING VALVE
Filed Sept. 20, 1957
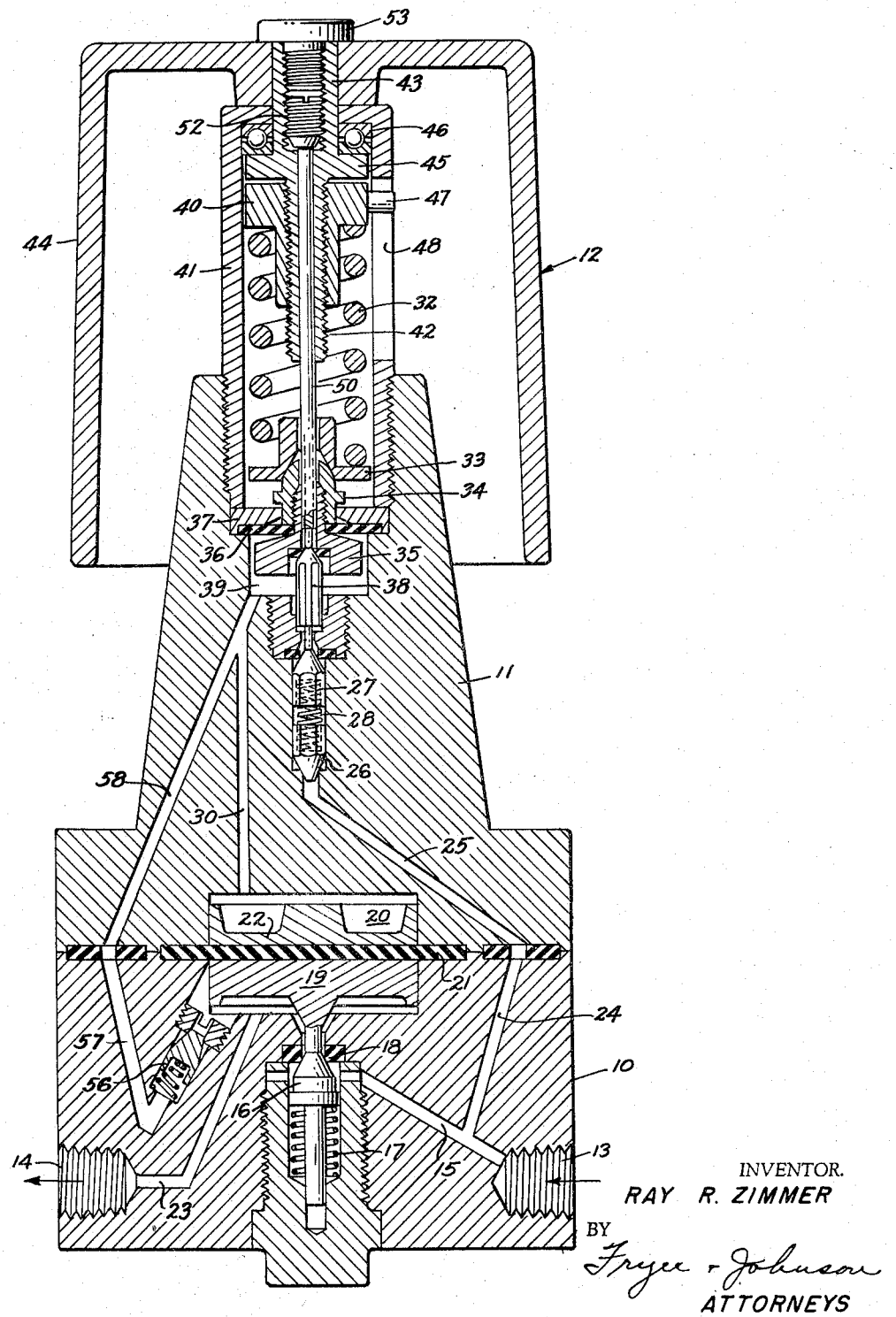
INVENTOR.
RAY R. ZIMMER
BY
*Fryer + Johnson*
ATTORNEYS

United States Patent Office 2,963,040
Patented Dec. 6, 1960

2,963,040

DOME TYPE REGULATING VALVE

Ray R. Zimmer, Sausalito, Calif., assignor to Victor Equipment Company, San Francisco, Calif., a corporation of Delaware Filed Sept. 20, 1957, Ser. No. 685,208

1 Claim. (Cl. 137—505.11)

This invention relates to regulating valves and particularly to the type of valve where regulation of the pressure between a high pressure source and a low pressure output is controlled by gas pressure in a so-called dome structure and in which the gas pressure in this dome is also regulated by a secondary or pilot regulating mechanism including an adjustable spring.

In many uses of pressure regulating valves it is essential that the output pressure be maintained at a constant even in the event of failure of the source pressure such as might occure if a compressor breaks down or if a tank of gas is removed to be replaced by a newly charged tank. It is also desirable that the output pressure be reduced when the pressure setting of the regulator is reduced so that in the event that the output pressure is captive, or in a dead end system, the higher pressure will not remain in that system when the regulator is adjusted to a lower setting as it does in conventional regulating valves.

It is therefore the object of the present invention to provide a regulating valve of the kind described which includes means for automatically reducing the output pressure when the dome pressure of the valve is reduced by a resetting of the regulating pressure.

A further object of the invention is to provide a regulating valve in which the output pressure in the absence of flow is maintained at the regulated maximum in the event of failure of the source pressure.

A still further object of the invention is to provide such a valve with means to effect automatic relief of the controlled pressure at a value which is a predetermined amount above the value of the controlled pressure and which varies automatically when the controlled pressure is regulated.

Further and more specific objects and advantages of the present invention and the manner in which they are accomplished are made apparent in the following specification wherein reference is made to the accompanying drawing.

The drawing is a schematic central vertical sectional view of a valve embodying the present invention.

The regulating valve of the present invention is illustrated as having a body portion 10 with a dome 11 secured thereto by means not shown, and a pilot or loading regulator generally indicated at 12 disposed above the dome for regulating the dome pressure which in turn regulates the output pressure of the valve. Inlet and outlet openings 13 and 14 respectively are shown in the body and fluid under high pressure entering the inlet is conducted as by a passage 15 to the main valve chamber which includes a valve 16 urged upwardly by a spring 17 to close against a seat 18. This valve is adapted to be opened by a piston 19 in a dome cylinder 20 which is divided by a diaphragm 21 and has a protective reciprocable pressure plate 22 overlying the diaphragm. The pressure in the cylinder 20 therefore overcomes the force of the spring 17 and the value of this pressure determines the output pressure of the valve as it controls the amount of fluid which passes the valve 16 and, by way of the lower portion of the dome cylinder 20, reaches the outlet 14 through a passage 23.

In order to control the pressure in the dome cylinder 20 a passage 24 which intercepts the inlet pressure passage 15 conveys the high pressure through a connecting passage 25 in the dome, then through a check valve 26, the purpose of which is later to be explained, until it is interrupted by a valve 27. The check valve 26 and valve 27 are of hexagonal form in a cylindrical bore in order that the fluid may pass them, and they are normally urged into contact with their respective seats by a common spring 28 interposed between them.

To effect opening of the valve 27 to permit a controlled fluid pressure to be communicated therethrough and through a passage 30 to the dome 20, the pilot regulator 12 is employed. This regulator includes a main spring 32 normally imposing a downward pressure on its seat 33 which bears against the upper spherical end of a nut 34 carried by a diaphragm retainer 35. This retainer 35 cooperates with the nut 34 to embrace the inner edge of a diaphragm 36, the outer periphery of which is secured by a plate 37. Pressure of the main spring 32 urges the entire diaphragm assembly downwardly and through an intermediate relief valve 38 opens the valve 27. Opening of this valve permits pressure flow into a chamber 39 below the diaphragm urging it upwardly against pressure of the spring 32 and thus controlling the value of pressure in the dome 20.

To vary the pressure in the dome 20, the force of the spring 32 is adjusted by advancing or retracting an upper spring seat 40 vertically movable in a spring housing 41 and having a threaded connection with a rotatable threaded post 42. The upper portion of this post shown at 43 carries a hand wheel or adjusting member 44 the rotation of which therefore serves to advance or retract the seat 40. The post 42 has a flange 45 thereon which bears against a thrust bearing 46 in the upper end of the housing 41. Rotation of the seat 40 is prevented by a projection 47 thereon in a vertically extending slot 48 in the side of the housing.

A loosely fitting rod 50 extends upwardly through a central bore in the post 42 and its lower end projects to a position where it will engage and unseat the valve 38 in the event that the wheel 44 is rotated to reduce pressure. The lower portion of this rod is also grooved where it passes through the diaphragm retaining member to permit gas to pass through these members. When the force of the spring 32 is reduced the pressure beneath the diaphragm 36 and its retainer 35 raises them to the point where the lower end of the rod 50 effects unseating of the valve 38. The excess pressure in the dome chamber 20 is therefore free to escape past this valve and upwardly through the spring housing 41 to atmosphere through the slot 48 therein. The effective length of the rod 50 is adjustable by a set screw 52 at its upper end normally concealed by a stud 53 which serves to hold the hand wheel 44 in place.

The structure insofar as is hereinabove described is conventional, and it is to the following improvements in valves of this kind that the present invention pertains. The invention is particularly concerned with maintaining of desired output pressure of such a valve in instances where the outlet 14 is in communication with a closed or dead end circuit. In one instance where this circuit is closed and a predetermined pressure is maintained at the outlet, it may be necessary to reduce the setting of the regulating valve in order to reduce the output pressure. In the conventional valve the output pressure is trapped in the instance of the closed circuit and will remain at a higher value than that desired.

There is also the condition in which the inlet pressure fails which might occur in the event of a breakdown of a compressor providing this pressure or the exhaustion of a tank from which the pressure is derived, necessitating removal and replacement of the tank. In the conventional valve, failure of the inlet pressure permits the dome pressure to escape back through the inlet opening. Thus the outlet pressure is free to escape backwardly through the inlet of the valve.

In order to overcome the first difficulty mentioned and to reduce the pressure in the outlet line when the valve is set to a low pressure after having been functioning at a higher outlet pressure, a check valve 56 is provided in a passage 57 which communicates between the lower portion of the dome cylinder 20 and a passage 58 communicating with the chamber 39 which contains the regulated dome pressure. This check valve normally prevents the higher regulating dome pressure from entering the outlet system in the lower portion of the dome cylinder 20. However, when the valve is reset to a lower value and the previous outlet pressure exceeds the dome pressure, this excess pressure is free to escape through the check valve and find its way to atmosphere in the manner previously described. This check valve 56 also serves as a safety relief valve which prevents excess pressure in the output system. Furthermore it has the advantage of relieving pressure slightly above that for which the regulator is set rather than at an arbitrarily predetermined maximum. For example if the valve 16 should leak high input pressure directly into the output system valve 56 will relieve this pressure at a value just slightly above the regulated dome pressure. Thus if the regulated pressure is varied the relief value pressure on the output line is also automatically varied.

In order to retain normal outlet pressure upon failure of inlet pressure, the pressure in the dome chamber 20 which is regulating and maintaining the outlet pressure is prevented from escaping backwardly through the inlet by the check valve 26 previously described. Since the check valve 26 is seated by pressure in the spring chamber 28 having the value of the inlet pressure before it failed, it prevents pressure from the dome 20 from escaping through the inlet passage.

Thus through very simple and inexpensive means the regulating valve of the present invention automatically retains high pressure in the output system when desired and automatically reduces this pressure when the setting of the regulator is reduced.

I claim:

In a dome-type regulating valve which includes a housing with inlet and outlet openings, valve means to control flow between said openings, a pressure responsive member to actuate said valve means in response to varying outlet pressure, pressure loading means acting upon the pressure responsive member to bias said valve means to open position, valve means to regulate the pressure loading means, venting means to relieve excess pressure of the pressure loading means, passageways communicating between the outlet opening, the pressure side of said pressure responsive member and the venting means, and a check valve in the passageway between the outlet and the pressure side of the pressure responsive member to relieve outlet pressure to said pressure side when it exceeds the pressure at said pressure side whereby it will be relieved through said venting means, and check valve means between the inlet opening and the pressure side of the pressure responsive member to prevent escape of pressure toward the inlet when inlet pressure is reduced.

References Cited in the file of this patent
UNITED STATES PATENTS

| | | |
|---|---|---|
| 2,047,101 | Grove | July 7, 1936 |
| 2,270,304 | Jacobsson | Jan. 20, 1942 |
| 2,342,659 | Grove | Feb. 29, 1944 |
| 2,747,607 | Matasovic | May 29, 1956 |
| 2,841,173 | Masom | July 1, 1958 |